United States Patent [19]
Kalopissis et al.

[11] 3,867,456
[45] Feb. 18, 1975

[54] MONO-OMEGA-HALOALKYL AMINES

[75] Inventors: Gregoire Kalopissis, Paris; Andree Bugaut, Boulogne sur Siene, both of France

[73] Assignee: Societe Anonyme dite: L'Oreal, Paris, France

[22] Filed: Jan. 7, 1972

[21] Appl. No.: 216,282

Related U.S. Application Data

[63] Continuation of Ser. No. 798,192, Feb. 10, 1969, abandoned, which is a continuation-in-part of Ser. No. 568,148, July 27, 1966, abandoned, continuation-in-part of Ser. No. 568,118, July 27, 1966, abandoned, and continuation-in-part of Ser. No. 607,898, Jan. 9, 1967, Pat. No. 3,617,163.

[30] Foreign Application Priority Data

| Jan. 10, 1966 | Luxembourg | 50,223 |
| June 24, 1966 | Luxembourg | 51,408 |
| Dec. 9, 1966 | Luxembourg | 52,555 |
| July 30, 1965 | Luxembourg | 49,214 |
| Jan. 27, 1966 | Luxembourg | 50,348 |
| July 4, 1966 | Luxembourg | 51,474 |

[52] U.S. Cl. ........ 260/574, 260/293.73, 260/293.79, 260/326 N, 260/371, 260/378, 260/556 AR, 260/570.7, 260/570.8 R, 260/577, 8/10, 8/10.1

[51] Int. Cl. .................. C07c 87/58, C07c 87/62

[58] Field of Search .......... 260/562, 571, 577, 574, 260/76, 562, 78

[56] References Cited
FOREIGN PATENTS OR APPLICATIONS
6,610,757 1/1967 Netherlands .................. 260/562

OTHER PUBLICATIONS
Chemical Abstracts, Vol. 64, 17516d, (1966).

*Primary Examiner*—Harry I. Moatz
*Attorney, Agent, or Firm*—Cushman, Darby & Cushman

[57] ABSTRACT

Compounds having the formula:

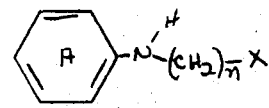

in which A is phenyl substituted by nitro and methylamino or methoxy;

$n$ is an integer between 2 and 6 inclusive, and X is a halogen atom.

2 Claims, No Drawings

MONO-OMEGA-HALOALKYL AMINES

This is a continuation of application Ser. No. 798,192 filed Feb. 10, 1969 now abandoned. This application is a continuation-in-part of applications Ser. No. 568,148, filed July 27, 1966 now abandoned, Ser. No. 568,118 filed July 27, 1966 now abandoned Ser. No. 607,898, filed Jan. 9, 1967 now U.S. Pat. No. 3,617,163. The disclosure of these applications are incorporated by reference in the present application to further show methods of making and using the compounds of this application and methods of making and using compounds that are made using the compounds of this application.

SUMMARY OF THE INVENTION

The object of the present invention is to provide a process for preparing secondary amine hair dyes having an alkyl ω-halogen chain, by using as intermediates their corresponding sulfonamide derivatives. The reactivity of the halogen atom makes these compounds very valuable as intermediates in synthesizing processes and as intermediates for forming nitrodiaminobenzene.

The compounds obtained by the process according to the invention respond to the following formula:

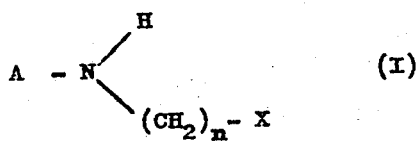

in which A is an aromatic group selected from the group consisting of substituted and unsubstituted phenyl, in which said substituted groups are selected from the group consisting of $NO_2$, amino, alkyl amino, $n$ is a whole number lying between 2 and 6 inclusive and X is a bromine atom.

The process according to the invention is essentially characterized by the fact that benzene sulfochloride or paratoluene sulfochloride is reacted with a primary amine having the formula $$A - NH_2$$

in which A has the significance hereinbefore set forth; that the resulting monosubstituted sulfonamide is reacted with an alkali hydroxide, an alkaline earth hydroxide, a sodium alcoholate, or a sodium amide to obtain the corresponding alkali or alkaline earth derivative, which is then isolated. This derivative is then reacted with an α, ω-dihaloalkane having the formula :

$$X (CH_2)_n - X$$

in which X and n have the significance hereinbefore set forth. The resulting N-ω-haloalkyl sulfonamide is then subjected to acid hydrolysis to yield as the end product a secondary N-ω-haloalkyl amine responding to the above formula (I).

As has been hereinbefore mentioned, these ω-haloalkyl secondary amines are valuable intermediates for use in the synthesis of other compounds, especially compounds in which the halogen is replaced by an amino group; such compounds are excellent dyes. Also, for example, by condensing their halogen atoms with secondary amines, potassium phthalimide (Gabriel's reaction), potassium cyanide, etc. . . , it is possible to produce corresponding substitution derivatives, such as tertiary amines, primary amines, nitriles, etc. It should be emphasized that, instead of using the Nω-halo-alkyl secondary amine as an intermediate, it is also possible to use N-ω-halo-alkyl sulfonamide itself, and then proceed to hydrolysis. The present invention therefore also relates to a process of preparing a disubstituted N-ω-halo-alkyl sulfonamide having the formula:

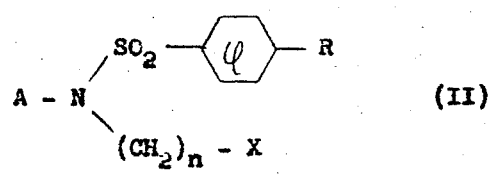

in which A, n, and X have the significances hereinbefore indicated and R is hydrogen or methyl.

It should also be noted that, even if the different steps of the process of making the compounds are carried out in a conventional manner, the process nevertheless offers the following advantages:

1. The isolation and utilization of the alkali or alkaline earth derivatives of the intermediate sulfonamides in a pure state.

2. The condensation of these derivatives with α, ω-dihaloalkane in solution in a polar aprotonic, non-ionic solvent such, for example, as dimethylformamide which will not react with the halogen atom. This method of condensation is preferable to the one which consists in carrying out this condensation by heating the alkali or alkaline earth derivative to reflux in an excess of α, ω-dihalo-alkane, which method may also be resorted to in certain cases.

In order that the invention may be clearly understood several embodiments thereof will now be described, purely by way of example.

EXAMPLE 1

Preparation of the Dye
1-N-Methylamino-2-Nitro-4-[N'-β-Bromoethyl]Amino Benzene

First step: Preparation of 1-N-methylamino-2-nitro-4-benzene-sulfonylamino benzene.

0.33 mol (58.2 g) of benzene sulfochloride is added little by little, at 45°C, while stirring, to a solution containing 0.3 mol (50.1 g) of 1-N-methylamino2-nitro-4-amino benzene in 200 cm³ of pyridine. After this addition has been completed the reaction mixture is kept at room temperature for three hours and then poured over 1 kg of cracked ice to which 100 cm³ of concentrated hydrochloric acid have been added, and the crude product is dried. It is then redissolved in 300 cm³ of a 2 N solution of sodium hydroxide. The resulting solution is then filtered and 2 g of the starting product, which is insoluble in the sodium hydroxide solution is recovered. The solution is then neutralized with a 2 N solution of hydrochloric acid. Drying yields 87 g of 1-N-methyl-amino-2-nitro-4-[benzene sulfonylamino] benzene, which, after recrystallization in alcohol, melts at 144°C.

| Analysis | Calculated for $C_{13}H_{13}N_3O_4S$ | Found |
|---|---|---|
| C % | 50.81 | 51.11 – 50.98 |
| H % | 4.23 | 4.38 – 4.14 |
| N % | 13.68 | 13.90 – 13.70 |

Second step: Preparation of the potassium derivative of 1-N-methylamino-2-nitro-4-N'-benzenesulfonylamino benzene.

1 mol (307 g) of 1-N-methylamino-2-nitro-4-N'-benzene-sulfonylamino benzene is dissolved in 2 liters of absolute ethanol. This solution is then poured into an alcoholic caustic potash solution obtained by dissolving 60 g of potash tablets in 180 cm³ of absolute alcohol, to which 30 cm³ of water have been added. After cooling and drying the yield is 320 g of the potassium derivative of the substituted benzenesulfonamide.

Third step: Preparation of 1-N-methylamino-2-nitro-4-(N'-benzene-sulfonyl-N'-β-bromoethyl) amino benzene Process A: Condensation by heating to reflux in an excess of 1,2-dibromo-ethane 0.1 mol (34.5 g) of the potassium salt of 1-N-methyl-amino-2-nitro-4-N'-benzenesulfonylamino benzene is heated for 9 hours, while being agitated, in 100 cm³ of 1,2-dibromo-ethane. This is filtered while boiling to eliminate the potassium bromide. After cooling the filtrate and adding a little hexane, drying yields 36 g of 1-N-methylamino-2-nitro-4-(N'-benzenesulfonyl-N'-β-bromo-ethyl) amino benzene. This product is treated with a cold ½ N sodium hydroxide solution to eliminate a little 1-N-methylamino-2-nitro-4-N'-benzenesulfonylamino benzene in the form of its sodium derivative. After washing with water and drying the yield is 35 g of the desired product which, after recrystallization in benzene, melts at 172°C.

| Analysis | Calculated for $C_{15}H_{16}O_4N_3SBr$ | Found |
|---|---|---|
| C % | 43.50 | 43.75 – 43.66 |
| H % | 3.86 | 4.05 – 4.08 |
| N % | 10.14 | 10.33 – 10.19 |

Process B: Condensation in solution in a polar aprotonic solvent.

0.05 mol (17.25 g) of the potassium derivative of 1-N-methylamino-2-nitro-4-N'-benzenesulfonylamino benzene is dissolved in 40 cm³ of dimethylformamide. 0.1 mol (18.8 g) of 1,2-dibromo ethane is added and held in the reaction mixture for half an hour at 80°C. The solution is cooled and poured into 500 cm³ of water and drying yields 18.5 of the brominated derivative which, after treatment with a ½ N sodium hydroxide solution (to eliminate a little of the starting product) and washing with water, melts at 172°C. (No lowering of the melting point is noted when the product is mixed with that yielded by process A).

Fourth step: Preparation of 1-N-methylamino-2-nitro-4-N'-β-bromoethylamino benzene 0.376 mol (130 g) of 1-N-methylamino-2-nitro-4-(N', benzenesulfonyl-N'-β-bromo-ethyl)amino benzene is introduced little by little, while stirring, into 375 cm³ of concentrated sulfuric acid. After dissolution is complete, the reaction mixture is left for 24 hours at room temperature, and then poured over 6 kg of ice. After neutralization, drying yields 110 g of 1-N-methylamino-2-nitro-4-N'-β-bromoethylamino benzene. After recrystallization, in a benzene-cyclohexane mixture the product melts at 86°C.

This compound can be used to dye live human hair and other keratinic fibers.

| Analysis | Calculated for $C_9H_{12}O_2N_3Br$ | Found |
|---|---|---|
| C % | 39.45 | 39.55 – 39.62 |
| H % | 4.38 | 4.43 – 4.60 |
| N % | 15.33 | 15.32 – 15.45 |

EXAMPLE 2

Use of the Brominated Product Obtained In The Fourth Step of Example 1 to Prepare the Dye 1N-Methylamino-2-Nitro-4- β-[N'-β-(Methyl-(β-Hydroxyethyl)-Amino-Ethyl Amino-Benzene A mixture of 0.15 mol (41 g) of 1-N-methylamino-2-nitro-4-N'-β-bromoethylamino benzene, obtained as in Example 1, and 1.2 mols (90 g) of N,N-methyl-β-hydroxyethylamine are heated for 7 hours at 120°C. The excess of N,n-methyl-β-hydroxyethylamine is eliminated under vacuum. The oily residue is dissolved in benzene and this benzenic solution is washed in water, dried on sodium sulfate, and filtered. After having eliminated the benzene under vacuum the yield is 38 g of 1-N-methylamino-2-nitro-4 β[N''-β-(methyl(β-hydroxy-ethyl)amino-ethyl amino]benzene, which is practically pure. The oily product is dissolved in normal propyl alcohol, cooled in ice and saturated with dry gaseous hydrochloric acid. 46 g of the desired product are obtained in the form of the dihydrochloride, which melts and decomposes at between 135°C and 145°C.

When the oily base is regenerated in the conventional manner from this dihydrochloride and analyzed, the results are as follows:

| Analysis | Calculated for $C_{12}H_{20}N_4O_3$ | Found |
|---|---|---|
| C % | 53.73 | 53.80 – 53.75 |
| H % | 7.46 | 7.55 – 7.49 |
| N % | 20.89 | 20.92 – 20.87 |

This compound is a dye particularly suitable for use in dyeing human hair.

EXAMPLE 3

Use of the Benzenesulfonamide Obtained in the Third Step of Example 1 to Prepare the Dye 1-Methylamino-2-Nitro-4-N'-β-Piperidino-Ethylamino Benzene First step: Preparation of 1-N-Methylamino-2-nitro-4-(N'-benzene-sulfonyl-N'-β-piperidinoethyl) amino benzene.

0.05 mol of the 1-N-methylamino-2-nitro-4-(N'-benzene-sulfonyl-N'-β-bromoethyl)amino benzene obtained at the end of the third step of Example 1 is dissolved in 34 g of piperidine. This solution is heated to reflux for 8 hours, and the excess piperidine eliminated under vacuum. The residue is dissolved in 3 N hydrochloric acid and drying yields the desired product in the form of the hydrochloride.

The hydrochloride is redissolved in hot water, filtered while hot, cooled, and alkalized by a 2 N solution of sodium hydroxide. Drying yields 16 g of 1-N-methylamino-2-nitro-4-(N'-benzenesulfonyl-N'-β-piperidinoethyl)-amino benzene, which, after recrystallization in 50% alcohol melts at 110°C.

Second step: Preparation of 1-N-methylamino-2-nitro-4-N'-β-piperidinomethylamino benzene.

0.024 mol (10 g) of the 1-N-methylamino-2-nitro-4-(N'-benzenesulfonyl-N'-β-piperidinoethyl)amino benzene is dissolved in 50 cm³ of concentrated sulfuric acid. The reaction mixture is left for 3 hours at room temperature, poured over cracked ice, and alkalized with 5N sodium hydroxide solution at five times normal strength. Drying yields 6 g of 1-N-methylamino-2-nitro-4-N'-β-piperidinoethylamino benzene which, after recrystallization in a benzene-hexane mixture, melts at 68°C.

| Analysis | Calculated for $C_{14}H_{22}N_4O_2$ | Found |
|---|---|---|
| C % | 60.43 | 60.38 – 60.25 |
| H % | 7.91 | 7.89 – 8.00 |
| N % | 20.14 | 20.02 – 20.16 |

The resulting composition is a dye particularly useful as a hair dye.

EXAMPLE 4

Use of the Benzenesulfonamide Obtained in the Third Step of Example 1 to Prepare the Dye 1-Methalamino-2-Nitro-4-N'-β-Aminoethylamino Benzene First step: Preparation of 1-N-methylamino-2-nitro-4-(N'-benzenesulfonyl N'-β-phthalimidoethyl)-amino benzene.

0.122 mol (50.5 g) of 1-N-methylamino-2-nitro-4-(N'-benzenesulfonyl N'-β-bromoethyl)amino benzene is dissolved in 150 cm³ of dimethylformamide. 0.162 mol (30 g) of potassium phthalimide is added and the reaction mixture heated for an hour in a boiling water-bath. It is filtered while hot, poured into two liters of water, and drying yields 57.5 g of the crude product which, after recrystallization in toluene, melts at 218°C.

| Analysis | Calculated for $C_{23}H_{20}O_6N_4S$ | Found |
|---|---|---|
| C % | 57.53 | 57.28–57.10 |
| H % | 4.17 | 3.98–4.20 |
| N % | 11.66 | 11.67–11.66 |

Second step: Preparation of 1-N-methylamino-2-nitro-4-(N'-benzenesulfonyl-N'-β-aminoethyl)amino benzene.

0.0162 mol (7.8 g) of the substituted phthalimide obtained in the first step, in solution in propanol with 0.032 mol (1.6 g) of hydrazine hydrate, is heated to reflux for 2 hours. After cooling, drying yields a phthalhydrazide and the propanol is driven off under vacuum. The residue is then dissolved in normal hydrochloric acid, filtered, and the filtrate alkalized with sodium hydroxide. Drying yields 4 g of a crude product which, after recrystallization in alcohol, melts at 95°C.

Thire step: Preparation of 1-methylamino-2-nitro-4-N'-β-aminoethylamino benzene.

0.0074 mol (2.6 g) of 1-N-methylamino-2-nitro-4-(N'-benzenesulfonyl-N'-β-aminoethyl)amino benzene is dissolved in 15 cm³ of sulfuric acid. The reaction mixture is left for 4 hours at room temperature and then poured over cracked ice, and alkalized with sodium hydroxide. After drying, the yield is 1.1 g of a crude product which, after recrystallization in a mixture of benzene and hexane, melts at 120°.

| Analysis | Calculated for $C_9H_{14}O_2N_4$ | Found |
|---|---|---|
| C % | 51.42 | 51.13 – 51.22 |
| H % | 6.66 | 6.51 – 6.51 |
| N % | 26.66 | 26.81 – 26.59 |

This compound is a dye particularly useful as a hair dye.

EXAMPLE 5

Preparation of the Dye 1-N-Methylamino-2-Nitro-4-N'-γ-Bromopropyl-Amino Benzene

The first and second steps of the process are the same as those described in Example 1.

Third step: Preparation of 1-N-methylamino-2-nitro-4-(N'-benzenesulfonyl-N'-γ-bromopropyl)-amino benzene.

0.1 mol (34.5 g) of the potassium derivative of 1-N-methylamino-2-nitro-4-N'-benzenesulfonylamino benzene is dissolved in 100 cm³ of dimethylformamide. 0.2 mol (40.4 g) of 1,3-dibromo propane is added, and after holding the reaction mixture for half an hour at 80°C, it is poured into a liter of water and drying yields 46 g of the crude product. This product is treated with a cold ½ N sodium hydroxide solution to eliminate a little sodium derivative of 1-N-methylamino-2-nitro-4-N'-benzenesulfonylamino benzene, and then washed with water. By fractional crystallization in alcohol, 30 g of 1-N-methylamino-2-nitro-4-(N'-benzylsulfonyl-N'-γ-bromopropyl)amino benzene and 8 g of bis-[N'-([4-N-methylamino-3-nitro]phenyl)]-benzenesulfamidopropane are separated out. The former melts at 134°C and the latter at 190°C.

| ANALYSIS OF PRODUCT which melts at 134°C | Calculated for $C_{16}H_{18}N_3O_4S\,Br$ | Found |
|---|---|---|
| C % | 44.85 | 44.96 – 45.03 |
| H % | 4.20 | 4.01 – 4.17 |
| N % | 9.81 | 9.99 – 9.98 |

Fourth step: Preparation of 1-N-methylamino-2-nitro-4-N'-γ-bromopropylamino benzene.

0.021 mol (9 g) of 1-N-methylamino-2-nitro-4-(N'-benzenesulfonyl-N'-γ-bromopropyl)amino benzene is dissolved at room temperature in 27 cm³ concentrated sulfuric acid. After having left the reaction mixture for 24 hours at room temperature, it is poured over 350 g of crushed ice, and alkalized with sodium hydroxide. On drying, the yield is 5.5 g of 1-N-methylamino-2-nitro-4-N'-γ-bromopropylamino benzene which, after recrystallization in alcohol, melts at 62°C.

| Analysis | Calculated for $C_{10}H_{14}N_3O_2Br$ | Found |
|---|---|---|
| C % | 41.66 | 41.79 – 41.67 |
| H % | 4.86 | 4.76 – 4.66 |
| N % | 14.58 | 14.80 – 14.69 |

EXAMPLE 6

First Method of Preparing the Dye
1-N-β-Bromoethylamino-2-Nitro-4-Acetylamino Benzene First step: Preparation of 1-N-p-toluenesulfonylamino-2-nitro-4-acetylamino benzene 1.5 mols (286 g) of p-toluenesulfochloride are added little by little, while stirring, at between 30° and 35°C, to a solution of 1.3 mols (235.5 g) of 1-amino-2-nitro-4-acetylamino benzene in 900 cm³ of pyridine. After this has been done, the reaction mixture is kept for 2 at 35°C, and poured over 4 kg of cracked ice, and treated with 450 cm³ of concentrated hydrochloric acid. Drying yields the desired crude product. This is dissolved in a 2 N solution of sodium hydroxide. The resulting solution is filtered, (thereby eliminating a little of the starting product as well as 1-N-bis-p-toluenesulfonylamino-2-nitro-4-acetylamino benzene) and then neutralized with hydrochloric acid. Drying yields 390 g of 1-N-p-toluene-sulfonylamino-2-nitro-4-acetylamino benzene which, after recrystallization in alcohol, melts at 162°C.

| Analysis | Calculated for $C_{15}H_{15}N_3O_5S$ | Found |
|---|---|---|
| C % | 41.57 | 51.51 – 51.77 |
| H % | 4.29 | 4.42 – 4.12 |
| N % | 12.03 | 12.11 – 12.12 |

Second step: Preparation of the calcium derivative of 1-N-p-toluenesulfonylamino-2-nitro-4-acetylamino benzene 0.287 mol (100 g) of 1-N-p-toluenesulfonylamino-2-nitro-4-acetylamino benzene is added while stirring to a liter of water to which 0.287 mol (16 g) of quick lime has first been added. Agitation is continued for three hours and drying yields the calcium derivative. In order to eliminate the excess lime, this derivative is agitated for an hour in 300 cm³ of a saturated ammonium chloride solution, dried, and washed first with a little water, and then with alcohol and acetone. 94 g of the calcium derivative are obtained.

Third step: Preparation of 1(N-p-toluenesulfonyl-N-β-bromoethyl)amino-2-nitro-4-acetylamino benzene 0.01 mol (7.36 g) of the calcium derivative of 1-N-p-toluenesulfonylamino-2-nitro-4-acetylamino benzene is dissolved in 36 cm³ of dimethylformamide. 0.02 mol (3.76 g) of 1,2-dibromoethane is added. The mixture is heated for an hour and a half in a boiling water-bath, and poured into 400 cm³ of water. Drying yields 7.9 g of the crude product which, after treatment with a normal sodium hydroxide solution to eliminate a little 1-N-p-toluenesulfonylamino-2-nitro-4-acetylamino) benzene used to start the reaction, is washed with water and then recrystallized in an acetone-water mixture. The resulting product melts at 215°C and analyzes as follows:

| Analysis | Calculated for $C_{17}H_{18}N_3O_5SBr$ | Found |
|---|---|---|
| C % | 44.73 | 44.63 – 44.62 |
| H % | 3.94 | 4.14 – 4.04 |
| N % | 9.21 | 9.12 – 9.17 |

Fourth step: Preparation of 1-N-β-bromoethylamino-2-nitro-4-acetylamino benzene 0.088 mol (4.015 g) of 1(N-p-toluenesulfonyl-N-β-bromoethyl)-amino-2-nitro-4-acetylamino)benzene is dissolved in 16 cm³ of concentrated sulfuric acid at between 0° and 5°C. The reaction mixture is left to stand for 3 hours and then poured over 150 g of crushed ice. Drying yields 2.4 g of 1-N-β-bromoethylamino-2-nitro-4-acetylamino benzene which, after recrystallization in ethyl acetate, melts at 156°C.

| Analysis | Calculated for $C_{10}H_{12}N_3O_3Br$ | Found |
|---|---|---|
| C % | 39.73 | 40.15 – 40.02 |
| H % | 3.97 | 4.06 – 4.15 |
| N % | 13.90 | 14.08 – 13.95 |

EXAMPLE 7

Second Method of Preparing the Dye
1-N-β-Bromo-Ethylamino-2-Nitro-4-Acetylamino Benzene First step: Preparation of 1-N-p-toluenesulfonylamino-2-nitro-4-acetylamino benzene The procedure is the same as in the first step of Example 6.

Second step: Preparation of the sodium derivative of 1-N-p-toluenesulfonylamino-2-nitro-4-acetylamino benzene.

A slight excess of sodium ethylate is added to a toluene solution of 1-N-p-toluenesulfonylamino-2-nitro-4-acetylamino benzene. Drying yields the sodium derivative, which precipitates instantaneously.

Third step: Preparation of 1-(N-p-toluenesulfonyl-N-β-bromoethyl)-amino-2-nitro-4-acetylamino benzene.

The procedure is the same as in Example 6, except that the reaction mixture need be heated in the boiling water-bath for only half an hour instead of an hour and a half.

Fourth step: Preparation of 1-N-β-bromoethylamino-2-nitro-4-acetylamino benzene.

The procedure is the same as in Example 6.

EXAMPLE 8

Preparation of the Dye
1-N-β-Chloroethylamino-2-Nitro-4-Amino Benzene

First and second steps:
The procedure is the same as that used in the first and second steps of Example 7 to prepare the sodium derivative of 1-N-p-toluenesulfonylamino-2-nitro-4-acetylamino benzene.

Third step: Preparation of 1-(N-p-toluenesulfonyl-N-β-chloroethyl)-amino-2-nitro-4-acetylamino benzene.

0.122 mol (45 g) of the sodium derivative is dissolved in 250 cm³ of dimethylformamide. 0.49 mol of 1,2-dichloro-ethane is added and the mixture heated for 4 hours in a boiling water bath. The reaction mixture is then poured over 2 kilograms of cracked ice and drying yields the crude product, which is then treated with a normal sodium hydroxide solution to eliminate the monosubstituted p-toluenesulfonamide used as a starting substance. The insoluble fraction (15 g) of the resulting solution is 1-(N-p-toluene sulfonyl-N-β-chloroethyl)amino-2-nitro-4-acetylamino benzene which, after washing with water and recrystallization in ethyl acetate, melts at 196°C.

Fourth step: Preparation of 1-N-β-chloroethylamino-2-nitro-4-amino benzene.

0.01 mol (4.1 g) of 1-(N-p-toluenesulfonyl-N-β-chloroethyl)amino-2-nitro-4-acetylamino benzene is introduced into a mixture consisting of 10 cm³ of concentrated hydrochloric acid and 10 cm³ of acetic acid. This is heated for two hours in a boiling water bath, cooled, and on drying yields the desired product in the form of the hydrochloride. After dissolving the hydrochloride in cold water, its pH is brought to 4 by adding ammonia and drying yields 1.9 g of 1-N-β-chloroethylamino-2-nitro-4-amino benzene which, after recrystallization in benzene, melts at 115°C.

| Analysis | Calculated for $C_8 H_{10} O_2 N_3 Cl$ | Found |
| --- | --- | --- |
| C % | 44.54 | 44.56 – 44.58 |
| H % | 4.64 | 4.51 – 4.58 |
| N % | 19.48 | 19.54 – 19.50 |

EXAMPLE 9

Use of the Product Prepared in the Third Step of Example 6 to Prepare the Dye 1-N-β-Piperidinoethylamino-2-Nitro-4-Amino Benzene First step: Preparation of 1-(N-p-toluenesulfonyl-N-β-piperidinoethyl)amino-2-nitro-4-acetylamino benzene.

0.0132 mol (6 g) of 1-(N-p-toluenesulfonyl-N-β-bromoethyl)-amino-2-nitro-4-acetylamino)benzene is dissolved in 10 cm³ of piperidine and heated to reflux for 8 hours. It is then filtered while hot, the piperidine is eliminated under vacuum, and the residual product is dissolved in a ½ N hydrochloric solution. This is filtered and alkalized, using a normal sodium hydroxide solution. Drying yields 5.6 g of 1-(N-p-toluenesulfonyl-N-β-piperidinoethyl)amino-2-nitro-4-acetylamino)benzene which, after recrystallization in alcohol, melts at 130°C.

Second step: De-tosylation and de-acetylation 0.0055 mol of 1-(N-p-toluenesulfonyl-N-β-piperidinoethyl)amino-2-nitro-4-acetylamino)benzene is dissolved in 10 cm³ of concentrated hydrochloric acid and heated for 4 hours in a boiling water-bath. It is then diluted with 50 cm³ of water, and alkalized with a 2N sodium hydroxide solution. Drying yields 1.3 g of 1-N-β-piperidinoethylamino-2-nitro-4-amino benzene which after recrystallization in a benzene-hexane mixture, melts at 95°C.

| Analysis | Calculated for $C_{13} H_{24} N_4 O_2$ | Found |
| --- | --- | --- |
| C % | 59.09 | 59.10 – 59.03 |
| H % | 7.57 | 7.56 – 7.62 |
| N % | 21.21 | 21.25 – 21.31 |

The resulting compound is a dye particularly useful for dyeing the hair.

EXAMPLE 10

Preparation of the Dye 1-N-β-Bromoethylamino-2-Nitro-4-(N'-Methyl-N'-Acetyl)Amino Benzene First step: Preparation of 1-p-toluenesulfonylamino-2-nitro-4-(N'-methyl-N'-acetyl)amino benzene 1.08 mols (206 g) of p-toluenesulfochloride are added little by little, while stirring, at between 40° and 45°C, to a solution of 0.94 mol (197 g) of 1-amino-2-nitro-4-(N'-methyl-N'-acetyl)amino benzene in 210 cm³ of pyridine. After this addition has been completed the reaction mixture is kept for 24 hours at room temperature, and then poured over 3 kg of cracked ice, to which 450 cm³ of concentrated hydrochloric acid have been added. A crude product is isolated which is then dissolved in methyl isobutyl ketone. The methyl isobutyl ketone solution is extracted with a 2N solution of sodium hydroxide. The sodium phase is acidified to pH 5 and drying yields 136 g of 1-p-toluenesulfonylamino-2-nitro-4-(N'-methyl-N'-acetyl)amino benzene which, after recrystallization in alcohol, melts at 120°C.

| Analysis | Calculated for $C_{16}H_{17} N_3O_5 S$ | Found |
| --- | --- | --- |
| C % | 52.89 | 53.03 – 52.82 |
| H % | 4.68 | 4.55 – 5.59 |
| N % | 11.57 | 11.53 – 11.70 |

Second step: Preparation of the potassium derivative of 1-N-p-toluenesulfonylamino-2-nitro-4-(N'-methyl-N'-acetyl) amino benzene 0.293 mol (77 g) of 1-N-p-toluenesulfonylamino-2-nitro-4-(N'-methyl-N'-acetyl)amino benzene is dissolved at reflux in 311 cm³ of 95° alcohol and poured little by little, while still boiling and being agitated, into 165 cm³ of a cold solution of potash in alcohol (25 g of potash per 100 cm³ of alcohol). This is cooled, and on drying yields 86 g of the potassium derivative.

Third step: Preparation of 1-(N-p-toluenesulfonyl-N-β-bromoethyl)amino-2-nitro-4-(N'-methyl-N'-acetyl)amino benzene 0.125 mol (50 g) of the above potassium derivative is dissolved in 145 cm³ of dimethylformamide. 0.37 mol (32 cm³) of 1,2-dibromo ethane is added. This reaction mixture is heated for an hour in a boiling water bath. After cooling, it is poured into 1.5 liters of water and the ethyl acetate is extracted. The ethyl acetate solution is extracted by using a normal iced sodium hydroxide solution to eliminate a little 1-N-p-toluenesulfonylamino-2-nitro-4-(N'-methyl-N'-acetyl)amino benzene in the form of its sodium derivative, and is then washed with water. After concentrating the ethyl acetate solution and adding hexane, drying yields 43 g of 1-(N-p-toluenesulfonyl-N-β-bromoethyl)amino-2-nitro-4-(N'-methyl-N'-acetyl)amino benzene which, after recrystallization in alcohol, melts at 137°C.

| Analysis | Calculated for $C_{18}H_{20}N_3O_5S\,Br$ | Found |
|---|---|---|
| C % | 45.95 | 45.94 – 45.91 |
| H % | 4.25 | 4.35 – 4.16 |
| N % | 8.93 | 9.15 – 9.09 |

Fourth step: Preparation of the dye 1-N-β-bromoethylamno-2-nitro-4-(N'-methyl-N'-acetyl)amino benzene by detosylation 0.0213 mol (10 g) of 1-(N-p-toluenesulfonyl-N-β-bromo-ethyl)amino-2-nitro-4-(N'-methyl-N'-acetyl)amino benzene is dissolved, while stirring in 20 cm³ of concentrated sulfuric acid. While maintaining its temperature between 0° and 5°C. The reaction mixture is left for 5 hours at 0°C, and then poured over 150 g of ice. Drying yields 6 g of 1 N-β-bromoethyl-2-nitro-4-(N'-methyl-N'-acetyl) amino benzene which, after recrystallization in ethyl acetate, melts at 131°C.

| Analysis | Calculated for $C_{11}H_{14}N_3O_3\,Br$ | Found |
|---|---|---|
| C % | 41.77 | 41.78 – 41.88 |
| H % | 4.43 | 4.54 – 4.60 |
| N % | 13.29 | 13.23 – 13.25 |

EXAMPLE 11

Use of the Product Prepared in the Third Step of Example 10 to Prepare the Dihydrochloride Dye of 1-N-β-Aminoethylamino-2-Nitro-4-N'-Methylamino Benzene First step: Preparation of 1-(N-p-toluenesulfonyl-N-β-phthalimidoethyl)amino-2-nitro-4-(N'-methyl-N'-acetyl)amino benzene 0.0266 mol (12.44 g) of 1-(N-p-toluenesulfonyl-N-β-bromoethyl)amino-2-nitro-4-(N'-methyl-N'-acetyl)amino benzene is dissolved in 40 cm³ of dimethylformamide, and 0.03 mol (5.6 g) of potassium phthalimide is then added thereto. The reaction mixture is heated for three quarters of an hour in a boiling water-bath, filtered while hot, and poured into 300 cm³ of water. Drying yields 12.5 g of 1-(N-p-toluenesulfonyl-N-β-phthalimidoethyl)amino-2-nitro-4-(N'-methyl-N'-acetyl)amino benzene which, after recrystallization in dioxane, melts at 188°C.

| Analysis | Calculated for $C_{26}H_{24}O_7N_4\,S$ | Found |
|---|---|---|
| C % | 58.20 | 58.40 – 58.29 |
| H % | 4.47 | 4.54 – 4.54 |
| N % | 10.44 | 10.21 – 10.37 |

Second step: Preparation of 1-N-β-phthalimidoethylamino-2-nitro-4-(N'-methyl-N'-acetyl)amino benzene 0.0112 mol (6 g) of 1-(N-p-toluenesulfonyl-N-β-phthalimidoethyl)amino-2-nitro-4-(N'-methyl-N'-acetyl) amino benzene is dissolved at between 0°C and 5°C in 15 cm³ of concentrated sulfuric acid and the reaction mixture is left for 4 hours at this temperature. It is then poured over cracked ice and on drying, yields 4 g of 1-N-β-phthalimidoethylamino-2-nitro-4-(N'-methyl-N'-acetyl)amino benzene which, after recrystallization in dimethylformamide, has two melting points, at 172°C and 205°C respectively.

| Analysis | Calculated for $C_{19}H_{18}N_4O_5$ | Found |
|---|---|---|
| C % | 59.68 | 59.78 – 59.76 |
| H % | 4.71 | 4.93 – 4.92 |
| N % | 14.65 | 14.76 – 14.83 |

Third step: Preparation of 1-N-β-aminoethylamino-2-nitro-4-(N'-methyl-N'-acetyl)amino benzene 0.0192 mol (7.3 g) of the substituted phthalimide obtained in second step, in solution in 50 cm³ of propanol with 0.039 mol (1.96 g) of hydrazine hydrate is heated to reflux for an hour and a half. After cooling, the phthalhydrazide formed is eliminated by drying and half of the propanol is eliminated under vacuum. Drying yields 4.1 g of 1-N-β-aminoethylamino-2-nitro-4-(N'-methyl-N'-acetyl) amino benzene which, after recrystallization in alcohol, melts at 137°C.

Fourth step: Preparation of the dihydrochloride of 1-N-β-aminoethylamino-2-nitro-4-N'-methylamino benzene 0.016 mol (4.04 g) of 1-N-β-aminoethylamino-2-nitro-4-(N'-methyl-N'-acetyl)amino benzene is heated in a mixture of 6 cm³ of concentrated hydrochloric acid and 1 cm³ of acetic acid, in a boiling water bath, for three hours. After cooling and drying the yield is 3.25 g of the dihydrochloride of 1-N-β-aminoethylamino-2-nitro-4-N'-methylamino benzene which, after recrystallization in concentrated hydrochloric acid, melts while decomposing at about 190°C.

This composition is a dye which is particularly useful for dyeing hair.

EXAMPLE 12

Preparation of the Dye
1-N-β-Bromoethylamino-2-Nitro-4-Methoxy Benzene

First step: Preparation of 1-N-p-toluenesulfonylamino-2-nitro-4-methoxy benzene 0.12 mol (22.86 g) of p-toluenesulfochloride is added to a solution of 0.1 mol (16.8 g) of 1-amino-2-nitro-4-methoxy benzene in 60 cm³ of pyridine at 30°C, little by little, while stirring. After the addition has been completed, the reaction mixture is left for 6 hours at room temperature, then poured over 300 g of ice to which 30 cm³ of hydrochloric acid have been added, and dried. The crude product is redissolved in a ½ N solution of sodium hydroxide. The resulting solution is filtered (thus recovering 4 g of the starting product which is insoluble in the sodium hydroxide), and neutralized with hydrochloric acid. Drying yields 25 g of 1-N-p-toluenesulfonylamino-2-nitro-4-methoxy benzene which, after recrystallization in alcohol, melts at 102°C.

| Analysis | Calculated for $C_{14}H_{14}O_5N_2S$ | Found |
|---|---|---|
| C % | 52.17 | 52.09 – 52.28 |
| H % | 4.34 | 4.34 – 4.44 |
| N % | 8.69 | 8.74 – 8.92 |

Second step: Preparation of the sodium derivative of 1-N-p-toluenesulfonylamino-2-nitro-4-methoxy benzene 0.155 mol of 1-N-p-toluenesulfonylamino-2-nitro-4-methoxy benzene is dissolved in 600 cm³ of ½ N sodium hydroxide, and 250 cm³ of 10 N sodium hydroxide are then added, while agitating the solution. Drying yields 48 g of the sodium derivative, which is washed first with a little alcohol and then with a little acetone.

Third step: Preparation of 1-(N-p-toluenesulfonyl-N-β-bromoethyl)amino-2-nitro-4-methoxy benzene 0.0103 mol (3.56 g) of the sodium derivative of 1-N-p-toluenesulfonylamino-2-nitro-4-methoxy benzene is dissolved in 5 cm³ of dimethylformamide. 0.023 mol of 1,2-dibromo ethane (2 cm³) is added and the mixture is brought to reflux for a quarter of an hour, after which it is poured into 50 cm³ of water. After extraction with ethyl acetate, the ethyl acetate solution is washed with ½ N sodium hydroxide to eliminate a little 1-N-p-toluenesulfonylamino-2-nitro-4-methoxy benzene, and then washed with water. It is then concentrated to about 10 cm³ and a little hexane added, whereupon drying yields 2.7 g of 1-(N-p-toluenesulfonyl-N-β-bromoethyl)amino-2-methoxy benzene which, after recrystallization, melts at 117°C.

| Analysis | Calculated for $C_{16}H_{17}N_2O_5SBr$ | Found |
|---|---|---|
| C % | 44.75 | 44.79 – 44.94 |
| H % | 3.96 | 4.17 – 4.14 |
| N % | 6.52 | 6.73 – 6.61 |

Fourth step: Preparation of 1-N-β-bromoethylamino-2-nitro-4-methoxy benzene by detosylation 0.093 mol (40 g) of 1-(N-p-toluenesulfonyl-N-β-bromoethyl)amino-2-nitro-4-methoxy benzene is dissolved in 160 cm³ of concentrated sulfuric acid while holding the temperature between 0° and 5°C. The reaction mixture is left for 3 hours at 0°C and then poured over 1.2 kg of crushed ice. Drying yields 25.1 g of 1-N-β-bromoethylamino-2-nitro-4-methoxy benzene which, after recrystallization in a benzene-hexane mixture, melts at 57°C.

| Analysis | Calculated for $C_9H_{11}N_2O_3Br$ | Found |
|---|---|---|
| C % | 39.27 | 39.41 – 39.36 |
| H % | 4.00 | 4.18 – 4.20 |
| N % | 10.18 | 10.39 – 10.27 |

EXAMPLE 13

Preparation of 2-β-Amino-Ethylamino Anthraquinone

The preparation process may be diagrammatically represented in the following manner:

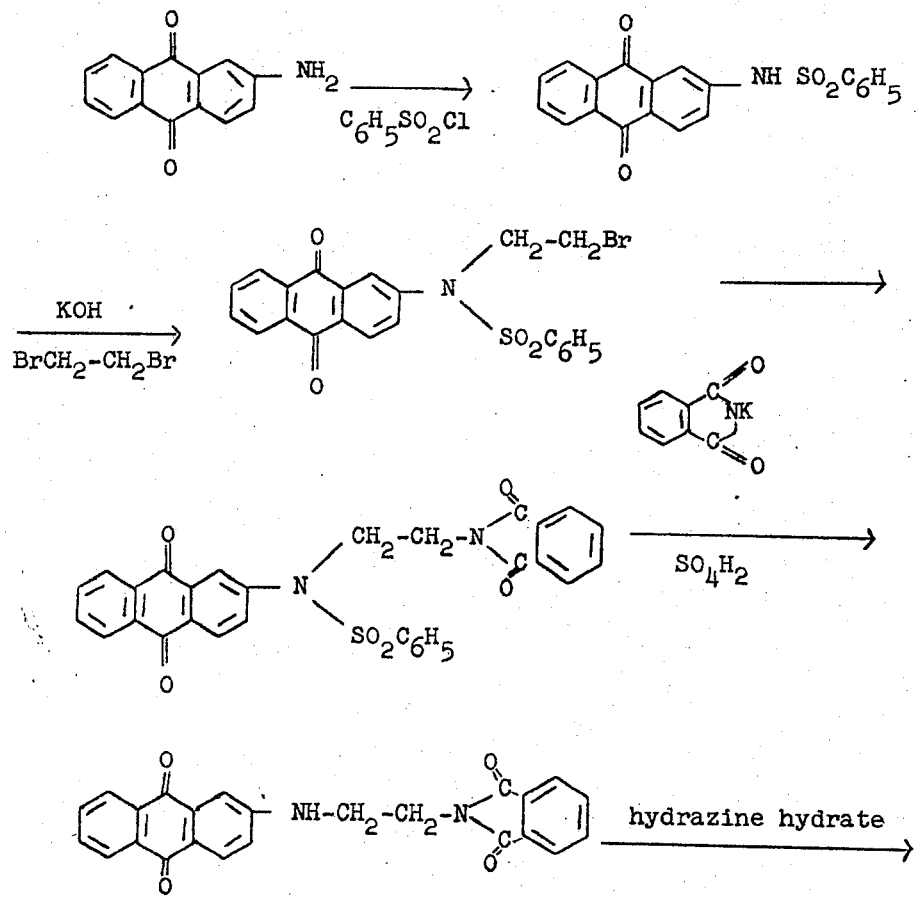

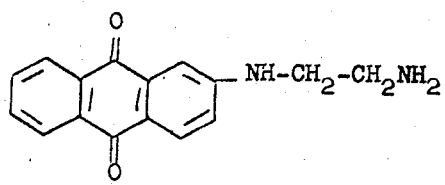

Step 1: Preparation of 2-N-benzenesulfonyl-amino anthraquinone 1.32 mols (166 cm³) of benzenesulfochloride are added little by little at 45°C with constant stirring to a solution of 1 mol (223 g) of 2-amino anthraquinone in 1800 cm³ of pyridine. When the addition is complete the reaction mixture is kept at 45°C for 4 hours. It is then cooled to 0°C. Drying yields the crude product which is then washed successively in slightly hydrochloric water, in water, and in alcohol. 320 g of practically pure benzene-sulfonamide are thus obtained, which melt at 276°C. 12 g of slightly less pure benzene-sulfonamide may be recovered from the pyridinic filtrate by dilution.

Step 2: Preparation of 2-(N-benzenesulfonyl-N-$\beta$-bromoethyl)-amino anthraquinone 0.05 mol (18.15 g) of 2-N-benzenesulfonyl-amino-anthraquinone is dissolved in 90 cm³ of dimethyl formamide at 60°C. 3.08 g of potassium hydroxide in solution in 2 cm³ of water and 6 cm³ of alcohol are added, and then, as rapidly as possible, 0.1 mol (18.8 g) of 1,2-dibromo-ethane. After the reaction mixture has been kept in a boiling water-bath for two hours, it is poured into a liter of ice water. Drying yields the crude product, which is treated with a ½ N sodium hydroxide solution to eliminate a little unreacted 2-N-benzensulfonyl-amino anthraquinone. The product is then washed with water. 15 g of 2-(N-benzenesulfonyl-N-$\beta$-bromoethyl)-amino-anthraquinone are thus obtained which, after recrystallization in acetic acid, melt at 155°C.

Step 3: Preparation of 2-(N-benzenesulfonyl-N-$\beta$-phthalimidoethyl)-amino anthraquinone 0.317 mol (148 g) of 2-(N-benzenesulfonyl-N-$\beta$-bromoethyl)-amino anthraquinone is dissolved in 675 cm³ of dimethylformamide; then 0.412 mol (76.5 g) of potassium phthalimide is added. The reaction mixture is carried to reflux for an hour, then cooled. Next it is poured into 6 liters of ice water. Drying yields 138 g of a crude product which, after recrystallization in acetic acid, melts at 236°C.

Analysis of the product yields the following results:

| Analysis | Calculated for $C_{30}H_{20}N_2O_6S$ | Found |
|---|---|---|
| C % | 67.16 | 67.07 – 66.93 |
| H % | 3.73 | 3.87 – 3.80 |
| N % | 5.22 | 5.27 – 5.20 |

Step 4: Preparation of 2-N-$\beta$-phthalimidoethylamino anthraquinone 0.225 mol (121 g) of 2-(N-benzenesulfonyl-N-$\beta$-phthalimidoethyl)-amino anthraquinone is dissolved in 600 cm³ of concentrated sulfuric acid while maintaining the temperature between 25° and 30°C. The reaction mixture is left at the ambient temperaturue for 5 hours; then it is poured over 5 kg of crushed ice. Drying yields 87 g of 2-N-$\beta$-phthalimidoethyl-amino anthraquinone, which melts at 270°C.

Step 5: Preparation of 2-N-$\beta$-aminoethylamino anthraquinone 0.21 mol (83 g) of 2-N-$\beta$-phthalimidoethylamino anthraquinone in solution in 300 cm³ of diethyleneglycol is heated at 110°C for 2 hours with 0.42 mol (21.5 g) of 98% hydrazine hydrate. After cooling, the reaction mixture is poured into 1.500 liters of water. It is acidified by adding concentrated hydrochloric acid while stirring and is put in a boiling water-bath until the resultant hydrochloride dissolves. After cooling, drying yields 59 g of the hydrochloride of 2-N-$\beta$-aminoethylamino anthraquinone containing a little phthalhydrazide hydrochloride. This crude product is treated with 350 cm³ of a 2-N potassium hydroxide solution. Drying yields 45 g of practically pure 2-N-$\beta$-aminoethylamino anthraquinone which, after recrystallization in pyridine, melts at 180°C.

Analysis of the product yields the following results:

| Analysis | Calculated for $C_{16}H_{14}N_2O_2$ | Found |
|---|---|---|
| C % | 72.18 | 72.42 – 72.35 |
| H % | 5.26 | 5.42 – 5.35 |
| N % | 10.52 | 10.54 – 10.40 |

EXAMPLE 14

Preparation of the Dye
1-Methylamino-2-Nitro-4-(N'-Methyl-N'-$\beta$-Aminoethyl)-Amino Benzene First step: Preparation of 1-methylamino-2-nitro-4-(N'-$\beta$-chloroethyl)amino benzene 0.33 mol (74 g) of 1-methylamino-2-nitro-4-(N'-methyl-N'-$\beta$-hydroxyethyl)amino-benzene is dissolved in 750 cm³ of dichloroethane. 0.37 mol (26 cm³) of thionyl chloride is added while stirring at room temperature. It is carried to reflux for an hour and chilled. Drying yields 75 g of 1-methylamino-2-nitro-4-(N'-methyl-N'-$\beta$-chloroethyl)-amino benzene in the form of the hydrochloride. After being dissolved in normal hydrochloric acid, boiled with a little animal black, filtered and chilled, it is rendered alkaline by use of a normal sodium hydroxide solution. Drying yields 58 g of a chlorinated derivative which, after recrystallization in a benzene-hexane mixture, melts at 90°C. The analysis of the end product is:

| Analysis | Calculated for $C_{10}H_{14}N_3O_2$ Cl | Found |
|---|---|---|
| C % | 49.28 | 49.52 – 49.51 |
| H % | 5.74 | 5.79 – 5.89 |
| N % | 17.24 | 17.45 – 17.28 |

Second step: A mixture of 0.02 mol (4.87 g) of 1-methylamino-2-nitro-4-(N'-methyl-N'-β-chloroethyl)amino benzene and 0.022 mol (4.07 g) of potassium phthalimide is carefully prepared by grinding, and then heated at 130°–140°C for 1 hour. After chilling and grinding the reaction mixture, washing with water eliminates the resultant potassium chloride and any potassium phthalimide which has not reacted. The fraction insoluble in water (6.53 g) yields, after recrystallization in benzene, 5.5 g of practically pure 1-methylamino-2-nitro-4-N'-methyl-N'-(β-phthalimidoethyl)-amino benzene which melts at 190°C. The analysis of this product is:

| Analysis | Calculated for $C_{18}H_{18}N_4O_4$ | Found |
|---|---|---|
| C % | 61.01 | 60.94 – 61.18 |
| H % | 5.08 | 5.30 – 5.18 |
| N % | 15.81 | 15.89 – 15.96 |

0.014 mol (5 g) of the substituted phthalimide obtained in the first step, in solution in propanol, is heated to reflux for 2 hours with a slight excess of hydrazine hydrate. After chilling, drying yields phthalhydrazide which is insoluble in propanol. Then dry gaseous hydrochloric acid is bubbled through to precipitate 2.3 g of dihydrochloride of 1-methylamino-2-nitro-4-(N'-methyl-N'-β-aminoethyl)amino benzene.

After this dihydrochloride has been recrystallized in a mixture of propanol and hydrochloric acid of density 1.19, a practically pure oily base is liberated in the conventional manner. The analysis of this product is:

| Analysis | Calculated for $C_{10}H_{16}N_4O_2$ | Found |
|---|---|---|
| C % | 53.57 | 53.50 – 53.62 |
| H % | 7.14 | 7.12 – 7.15 |
| N % | 25.00 | 24.81 – 24.93 |

What is claimed is:
1. 1-N-β-bromoethylamino-2-nitro-4-methoxy benzene.
2. 1-N-methylamino-2-nitro-4-N'-β-bromoethylaminobenzene.

* * * * *